(No Model.)
C. W. SCHMIEDING & C. G. UDELL.
Rope Reel.
No. 230,665. Patented Aug. 3, 1880.
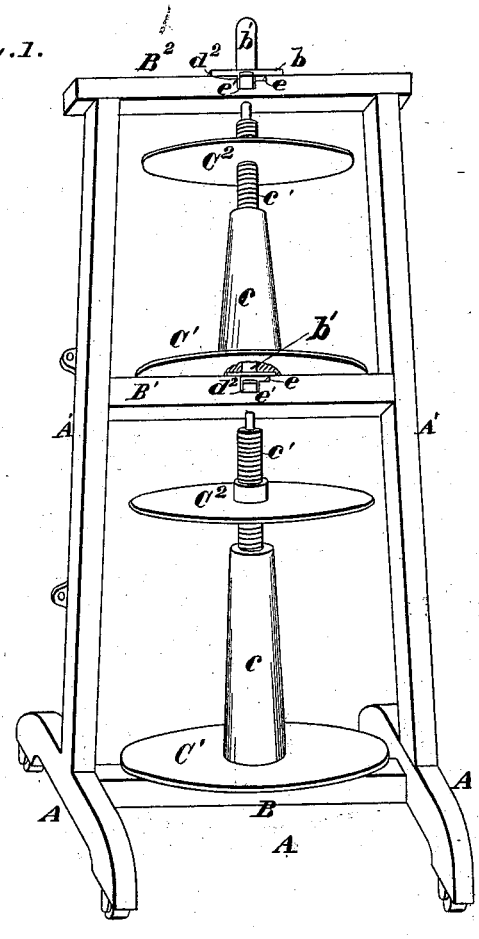
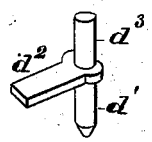
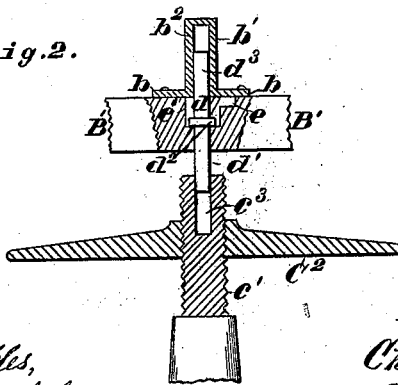
Attest:
Charles Pickles,
John W. Herthel,
Inventors:
Charles W. Schmieding.
Calvin G. Udell.
per
William W. Herthel,
their Atty.

United States Patent Office.

CHARLES W. SCHMIEDING, OF ST. LOUIS, MISSOURI, AND CALVIN G. UDELL, OF INDIANAPOLIS, INDIANA.

ROPE-REEL.

SPECIFICATION forming part of Letters Patent No. 230,665, dated August 3, 1880.

Application filed April 6, 1880. (No model.)

*To all whom it may concern:*

Be it known that we, CHARLES W. SCHMIEDING, of St. Louis, in the county of St. Louis and State of Missouri, and CALVIN G. UDELL, of Indianapolis, county of Marion, and State of Indiana, have invented certain new and useful Improvements in Rope-Reels, of which the following is a specification.

Our invention relates to certain improvements in rope-reels, in which a screw-threaded shaft at the upper end of the reel-spool is made hollow and operates in conjunction with a T-shaped drop or catch; and the objects of our improvements are, first, to afford facilities for the proper support of the reel-spools on the frame; second, to provide a means for retaining said reel-spools in position, and to permit them to freely revolve on their respective spindles above and below; third, to provide a means for readily detaching the reel-spools from the frame when it is desired to replenish them with coils of rope; fourth, to provide the reel-spools with an upper disk that can be adjusted up and down, by means of which various sizes of coils of rope may be securely held in place on the spools. These objects we attain by the mechanism illustrated in the accompanying drawings, in which—

Figure 1 represents a perspective view of the entire device set up, ready to receive the coils of rope. Fig. 2 is an enlarged vertical sectional view of the same, taken through the center of the bearings of the reel-spool; and Fig. 3 is a perspective view of the upper adjustable pivot-bearing.

Similar letters refer to similar parts throughout the several views.

The frame-work of the reel is composed of the base A A, the upright side standards, A' A', and the cross-bars B B' B², all of which are firmly united together, with no movable or adjustable parts, as shown.

$c$ represents the reel-spool, provided with a stationary lower disk, C', adapted to hold the coils of rope. The lower end of the spool $c$ and the lower disk attached thereto are provided with a hole or socket of sufficient size to permit the hollow spindle $b\ b'$ to fit therein, and on which the lower end of the spool revolves. The spindle $b\ b'$ is hollow, as shown at $b^2$, Fig. 2, the object of which will be hereinafter described.

In the upper end of the spool $c$ is firmly secured the screw-threaded stud $c'$. The upper end of this screw-threaded stud is provided with a socket, $c^3$, to receive and hold the bearing $d'$ of the adjustable T-shaped pivot, on which the upper end of the spool revolves, as will be hereinafter described.

The full length of the spool, consisting of the disk C', spool $c$, and screw-threaded stud $c'$, is enough less than the space between the bars B and B', or between the bars B' and B², to permit the spools to be removed from or replaced on the hollow spindles $b\ b'$ when the adjustable T-shaped pivot-bearing is raised so as to remove the bearing $d'$ from the socket $c^3$ of the screw-threaded stud $c'$.

The cross-bars B' and B² are each provided with a recess under the hollow spindle $b\ b'$, and this recess is of peculiar construction, to wit: The part $e'$ is deeper than the part $e$—that is, there is a depth given to the part $e'$ from the bottom of the part or step $e$ a little more than the depth to which the pivot part $d'$ of the adjustable T-shaped bearing is inserted in the socket $c^3$ of the screw-threaded stud $c'$.

The adjustable T-shaped pivot-bearing shown in Fig. 3 is provided with the vertical bearings $d'$ below and $d^3$ above, and midway between the ends of these bearings is a stem or handle, $d^2$. The end $d'$ of this T-shaped adjustable pivot-bearing is inserted in a hole formed in the center of the cross-bar B' or B², with the stem or handle $d^2$ projecting out at the side, and resting either on the floor of the recess $e$ or on the floor of the recess $e'$. On the upper bearing, $d^3$, is then placed the hollow spindle $b\ b'$, the bearing $d^3$ operating in the hollow or socket $b^2$, and the spindle $b\ b'$ is made fast to the upper side of the cross-bar in the position shown.

Having thus described the construction and arrangement of our improvements, together with various other parts which are old, we will now describe the mode of operating them as follows, to wit: When it is desired to remove a spool for the purpose of placing thereon a coil of rope, the stem $d^2$ of the adjustable T-shaped pivot is raised and carried onto the floor of the recess $e$, where it is retained in an elevated position. At the same time the bearing $d'$ at the bottom of the T-shaped pivot-bearing is withdrawn from the socket $c^3$ of the screw-threaded stud $c'$. The spool $c$ is then tilted to one side of the frame and lifted off of the spindle $b\ b'$. The adjustable disk $C^2$, which is provided with a screw-thread in its central hole, is then unscrewed from the stud $c'$, and the coil of rope is placed on the spool $c$ with its lower end resting on and supported by the lower disk, $C'$. The adjustable disk $C^2$ is then screwed onto the stud $c'$ until the coil of rope is clamped between it and the lower disk, $C'$. The spool, with its coil of rope, is then placed on the spindle $b\ b'$ and straightened up until the socket $c^3$ is under the pivot-bearing $d'$, when the stem $d^2$ is moved over the recess $e'$ and lowered down until the pivot-bearing $d'$ is in the socket $c^3$. The spool is now held in position with its coil of rope ready to be unwound, as may be desired.

We are aware that prior to our invention rope-reels have been made with hinged movable cross-bars, and with various other devices differing from ours in the essential features of construction and mode of operation, for the purpose of supporting and holding the reel-spools in position in the frame, and for permitting the spools to be removed from the frame, and to such old devices we make no broad claim; but What we do claim as our invention, and desire to secure by Letters Patent, is—

1. In a rope-reel, the spool $c$, provided at its lower end with the disk $C'$, having a hole or socket in its center, and also provided with the screw-threaded stud $c'$ in its upper end, said stud having a socket, $c^3$, in its upper end, combined with the hollow spindle $b\ b'$ below and the T-shaped adjustable pivot $d\ d^2\ d^3$ above, and the cross-bar $B'$, having a recess composed of the shallow and deep parts $e\ e'$, substantially as specified.

2. In a rope-reel, the cross-bar $B'$, with a vertical hole in its center, the upper part of which is provided with the shallow and deep recesses $e\ e'$, combined with the hollow spindle $b\ b'$, the T-shaped adjustable pivot $d\ d^2\ d^3$, and the stud $c'$ of the spool, having a socket, $c^3$, in its top, substantially as specified.

In testimony whereof we have signed our names to this specification in the presence of two subscribing witnesses.

CHARLES W. SCHMIEDING.
CALVIN G. UDELL.

Witnesses to Charles W. Schmieding's signature:
WILLIAM W. HERTHEL,
JOHN W. HERTHEL.

Witnesses to Calvin G. Udell's signature:
G. H. KENNETT,
E. O. FRINK.